United States Patent [19]

Mitchell

[11] 3,911,271

[45] Oct. 7, 1975

[54] RADIOISOTOPE GAUGE FOR DETERMINING CEMENT CONTENT OF CONCRETE

[75] Inventor: Terry Michael Mitchell, Reston, Va.

[73] Assignee: The United States of America as represented by the Secretary of the Department of Transportation, Washington, D.C.

[22] Filed: Apr. 22, 1974

[21] Appl. No.: 462,618

[52] U.S. Cl. ............... 250/252; 250/308; 250/363
[51] Int. Cl.² ................ G01D 18/00; G01N 23/00
[58] Field of Search .......... 250/252, 272, 304, 308, 250/358, 359, 360, 363

[56] References Cited
UNITED STATES PATENTS

| | | | |
|---|---|---|---|
| 3,597,596 | 8/1971 | Lawless et al. | 250/363 X |
| 3,626,183 | 12/1971 | Berry et al. | 250/363 |
| 3,735,126 | 5/1973 | Casper | 250/272 X |

*Primary Examiner*—Archie R. Borchelt
*Attorney, Agent, or Firm*—Herbert E. Farmer; Harold P. Deeley, Jr.

[57] ABSTRACT

A non-destructive testing technique for determining the amount of a constituent of interest in a mixture. The technique employs a probe which contains a single source of radiation and a detector for radiation backscattered from the test mixture. The probe is movable, in stepwise fashion, inside a tubular spacer mounted in and coaxial of a sample holder. The invention also contemplates the use of a standard having constant radiation absorption characteristics; backscattered radiation from the test mixture and standard being compared to provide information commensurate with the amount of the constituent.

5 Claims, 3 Drawing Figures

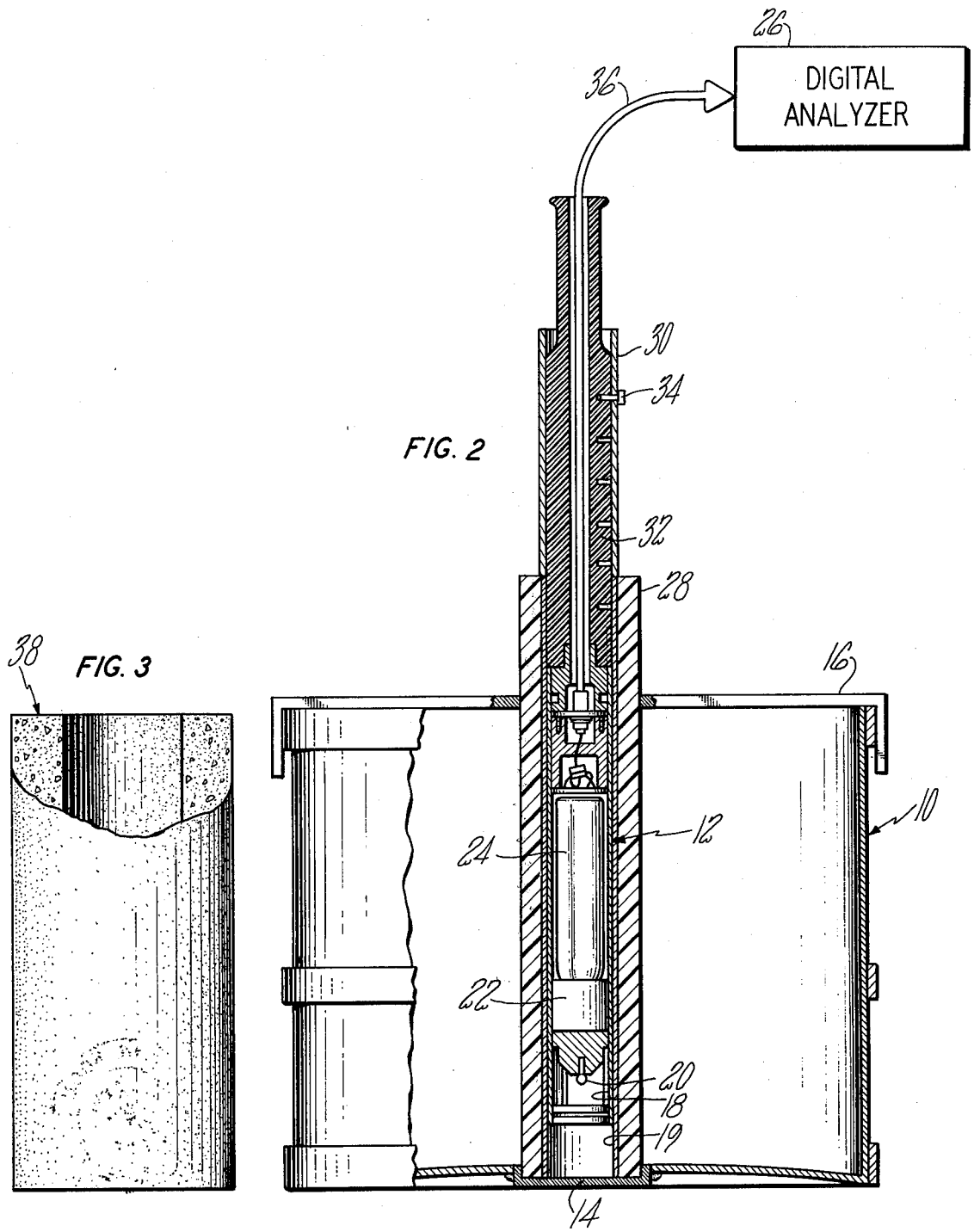

RADIOISOTOPE GAUGE FOR DETERMINING CEMENT CONTENT OF CONCRETE

ORIGIN OF THE INVENTION

The invention described herein was made by an employee of the United States government and may be manufactured and used by or for the government for governmental purposes without the payment of any royalties thereon or therefor.

BACKGROUND OF THE INVENTION:

1. Field of the Invention

The present invention relates to the exercise of quality control over coalesceable materials and particularly concrete. More specifically, this invention is directed to apparatus for measuring the cement content of wet Portland cement concrete. Accordingly, the general objects of the present invention are to provide novel and improved methods and apparatus of such character.

2. Description of the Prior Art

The exercise of quality control over Portland cement concrete, both in the field and in the laboratory, and the qualification of new mixing equipment and methods have presented problems of long standing in the art. Quality control is particularly desirable, and in fact may be considered mandatory, at construction sites where the rapid, simple and accurate analysis of plastic concrete is necessary to the enforcement of specifications.

At the present time quality control of concrete depends primarily on tests, for example performed on strength cylinders, which do not yield results until a substantial time, measured in days or weeks, after the concrete has been poured. Thus, pre-placement quality control over cement is presently largely exercised by inspectors stationed at batching sites to oversee the weighing-in of cement, aggregates, admixtures, and water, and the measurement of such quantities as slump, air content and unit weight. Obviously such inspector exercised control is subject to human and scale errors, erratic or erroneous mixing techniques, and changes in water and air content prior to the pour. Any human or mechanical errors in the present mode of the control, as might be detected subsequent to the setting of the concrete by tests performed on a strength cylinder, are obviously very expensive to rectify.

The strength of concrete is related to the cement and water content of the wet mix, the bulk density, and the degree of air entrainment in the wet mix. Ideally, onsite measurement of these parameters should be made within the short time available between delivery and pouring thereby permitting unsatisfactory concrete to be rejected.

Devices and methods are presently available for the rapid non-destructive measurement of bulk density, air entrainment and consistency of fresh concrete. There are also test methods presently available for cement content determination. The most widely accepted cement content measuring techniques, however, are based on a physical separation (sieving) of the coarse aggregate in the concrete from the mortar followed by chemical or physical determinations of the amount of cement present in the motar phase. These prior art cement content tests are either very slow, highly susceptible to testing errors, or possess both deficiencies.

It is known that the photoelectric absorption of gamma rays in a wet concrete mix is dependent on the cement content of the mix; i.e., it was previously known that low energy gamma radiation backscatter and absorption is a function of the chemical composition of an irradiated attenuating matrix and that cement is a high atomic number material which will absorb backscattered radiation. It has been previously proposed to employ a source of gamma radiation in the analysis of the cement content of fresh concrete. The state of the art with respect to such nuclear based methods and apparatus is exemplified by U.S. Pat. No. 3,626,183. The method and apparatus of U.S. Pat. No. 3,626,183 employs a pair of radioisotope gamma radiation sources and is characterized by technical complexity and substantial initial cost. Additionally, the use of a plurality of radiation sources and the associated discrimination circuitry of the patented instrument causes relatively long measuring times and particularly results in the expenditure of substantial time in generating calibration curves for new aggregates. The aforementioned and other factors, in turn, result in rather complicated operating procedures which are not well suited for use in the field.

SUMMARY OF THE INVENTION

The present invention overcomes the above discussed and other deficiencies and disadvantages of the prior art by providing a novel technique for rapidly and easily determining the cement content of concrete and an improved radioisotope gauge for use in the practice of the said method. Apparatus in accordance with the present invention employs a probe which contains a single gamma ray source and a detector for backscattered radiation. The probe is movable, in stepwise fashion, inside a tubular spacer which is mounted in and coaxial of a bucket-type sample holder.

The present invention also contemplates the use of a "standard" consisting of an annular shaped member. In use an "average" count is recorded by inserting the "standard" in the sample holder over the tubular spacer. Thereafter, the sample holder is filled with a wet concrete sample and a plurality of counts are recorded at different vertical positions of the probe. The average of the recorded sample counts is compared with the count recorded with the "standard" installed and the ratio of the "standard" to average sample counts will indicate, from prerecorded curves, the cement content of the sample.

In a preferred embodiment the "standard" consists of an annular shaped cast concrete member which has been impregnated with methyl methacrylate monomer and subsequently polymerized by irradiation. The use of a polymer-impregnated concrete standard provides compensation for error-producing changes in the electronics of the measuring equipment with time and temperature. The standard employed in the present invention does not have to bear any relationship to the concrete samples to be measured since it is employed purely as a tool to compensate for variations in the electronics of the measuring equipment associated with the probe detector.

BRIEF DESCRIPTION OF THE DRAWING

The present invention will be better understood and its numerous objects and advantages will become apparent to those skilled in the art by reference to the accompanying drawing wherein:

FIG. 2 is a schematic side elevation view, partly in section, of a preferred embodiment of the invention; and FIG. 3 is a side elevation view, partly in section, of a "standard" for use with the apparatus of FIG. 2.

DESCRIPTION OF THE PREFERRED EMBODIMENT

Figure 1:
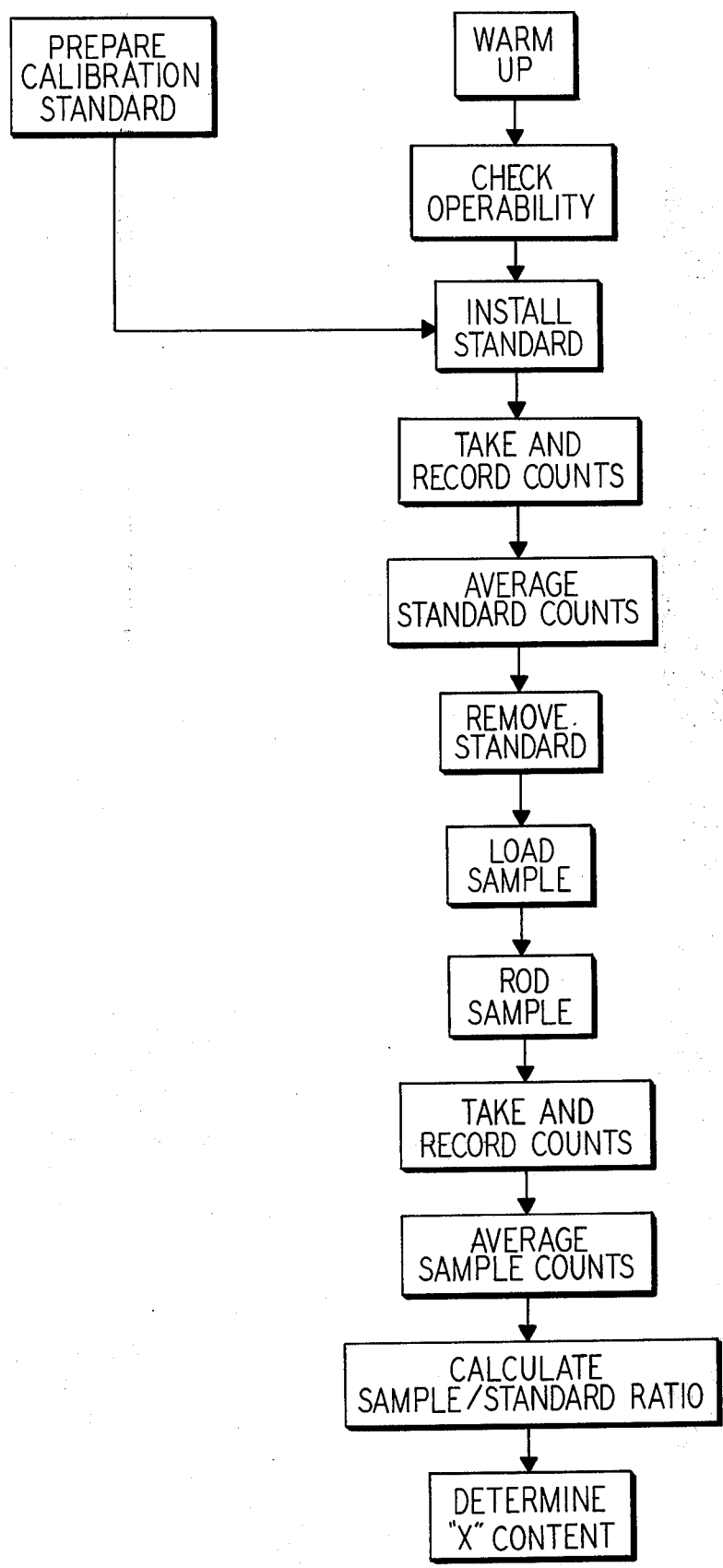
FIG. 1 is a flow diagram depicting the steps performed in the practice of the present invention.

With reference now to FIG. 2 of the drawing, a radioisotope gauge for determining the amount of a single constituent of a mixture, and particularly the cement content of concrete, includes a sample holder indicated generally at 10 and a probe indicated generally at 12. The sample holder 10 is generally in the form of a bucket having, welded in an aperture provided at the bottom thereof, a steel member 14 which defines a cup-shaped receptacle. The purposes of member 14 and a cooperating upper support bar 16, which may be positioned on the rim of the "bucket" 10 by two socket head screws, will be described in greater detail below.

The probe 12 consists of a thin-walled aluminum casing 18 which contains a partially-shielded radiation source 20. In the disclosed embodiment, which is intended for use in determining the cement content of concrete, the radiation source 20 will comprise a fourteen millicurie source of Americium-241 which supplies 60 Kev gamma rays. The dominant attenuating mechanism for the radiation emitted from source 20 is a photoelectric absorption process. In the photoelectric process the energy of a gamma ray is given up completely to a tightly bound electron which is subsequently ejected from its orbit. The partial absorption coefficient, i.e., the measure of the gamma ray absorption per unit path length, for the photoelectric process is proportional to sample density, atomic number of the absorbing nucleus and gamma ray energy. The amount of radiation reaching a specific location, for example the location of a scintillation crystal type detector, after passing through the sample thus varies inversely as the average atomic number of the sample. In many concrete mixes the calcium in the cement is the highest element in the periodic table present in significant quantities and thus the gamma ray absorption is a function of cement content.

The probe 12 also includes a detector 22 for absorbing gamma radiation returned from a sample in the "bucket" 10. Detector 22 is disposed within the probe at a point above the radiation source 20 so as to receive backscattered radiation and to be shielded from direct radiation emanating from source 20. Experiments have shown that the backscatter geometry is much less sensitive to the heterogeneity of a concrete mix than is a direct transmission geometry. In a preferred embodiment of a cement content analyzer the detector 22 is a sodium iodide scintillation crystal which absorbs the gamma rays returning from the sample and converts them to light flashes. A photomultiplier tube 24 is mounted within the probe immediately above the detector 22 and is responsive to the light flashes provided by detector 22. The photomultiplier tube converts the light flashes to electrons at its photocathode and thereafter multiplies the electrons to provide a current pulse which is delivered to a digital analyzer, indicated at 26, for amplification and counting.

A radioisotope gauge in accordance with the present invention further comprises a tubular Plexiglas spacer 28 provided with a steel inner sleeve 19. The sleeve 19 has an inner diameter commensurate with the outer diameter of probe 12. Spacer 28 is received in the cup in member 14 at the bottom of the sample "bucket" 10 whereby proper positioning of the spacer within the bucket is insured. The spacer 28 is supported, adjacent its upper end, by means of the aforementioned support bar 16. The spacer 28 insures the accuracy of the gauge when the mixture being tested is comprised of aggregates containing significant quantities of calcium or elements higher than calcium in the periodic table. The Plexiglas cylinder is relatively transparent to low energy gamma radiation and it thus functions as an air gap. The volume of concrete "seen" by the radiation before detection is accordingly increased substantially and heterogeneity effects are minimized by use of the spacer 28.

The gauge of the present invention further comprises a locating sleeve 30 and a cooperating support rod 32; the sleeve 30 and support rod 32 being provided with slots or apertures which may be engaged by a locating pin 34 to determine the degree of insertion of the probe into the sample holder. The support rod 32 is preferably comprised of nylon and is hollow in order to permit connection between the probe components and analyzer 26 via a coaxial cable 36. As noted, the rod 32 contains machined locating slots and, at its upper end, a gripping area whereby the entire probe assembly can be supported manually during vertical adjustment of the probe. The locating sleeve 30 will typically be comprised of stainless steel and the locating pin 34 will be mounted thereon. Sleeve 30 will seat on the top of the spacer assembly 19, 28 as shown.

The analyzer 26 is a standard commercially available device including a regulated variable high voltage power supply, an electronic timer, a pulse amplifier with variable gain, appropriate low voltage power-supplies for the electronics and a single channel pulse counter with two scalers and a digital decade display. The analyzer 26 supplies power to the probe, amplifies the pulses provided by the photomultiplier tube 24, and counts the pulses. The size of the current pulses from the probe are directly proportionate to the energy of the gamma rays absorbed in the scintillation crystal 22 and the analyzer permits counting in any part of the energy spectrum with a "window" of either variable width or above a threshold energy.

The present invention also contemplates the use of a standard as indicated generally at 38 in FIG. 3. The standard 38 is fabricated so as to fit into the "bucket" 10 about the spacer 28. In a cement content gauge a particularly useful sample has been found to be one formed of cast concrete which has been impregnated with methyl methacrylate monomer and then polymerized by irradiation. This "PIC" (Polymer-Impregnated Concrete) standard has very low permeability and thus retains the same composition in a wide variety of environments. As will become apparent from the description of operation below, the standard permits compensation for error-producing changes in the electronics of the analyzer with time and temperature. It is particularly to be noted that the standard need have no relation to the sample to be measured; i.e., in a cement gauge the standard does not necessarily have to be comprised of concrete. The standard is used purely as a tool to eliminate variations in the electronics.

The operation of a gauge in accordance with the present invention will now be described. Operation of the gauge presumes that calibration curves have previously been generated in the laboratory with the aggregates of interest. After a suitable warm-up period, three 20-second counts are taken with the probe 12 at its lowest position in the sample holder 10. If the average of these three counts differs by more than 10% from a normal reading determined when the calibration curve was generated, it will be presumed that the gauge is faulty and should be repaired. If the apparatus is properly functioning the next step is the removal of support bar 16 and the insertion of the calibration cylinder or standard 38 in the "bucket" 10 by sliding the cylinder down over the spacer 28. A 20-second reading is taken with the probe at the lowest of the six positions established by the machined locating slots in rod 32. In a typical case 12 such counts are taken and recorded and the average count is calculated and used as the "standard" count.

After the average "standard" count has been calculated the calibration cylinder 38 is removed, the support bar 16 replaced and the sample holder 10 is filled with the sample. In one reduction to practice the "bucket" 10 held one cubic foot of fresh concrete. The sample holder is loaded with the test mixture following the standard procedure for filling a unit-weight bucket; i.e., three lifts or layers each rodded 25 times and tapped ten times. The top surface of the concrete in "bucket" 10 must be within one inch of the top of the sample holder but does not need to be leveled or finished.

With the mixture being tested in the sample holder, a sequence of six readings is made with the probe at the vertical positions established by the machined locating slots in rod 32. The average of these six readings is then calculated for use as the "sample" count.

With the "standard" and "sample" counts available, the operator calculates the ratio of the "sample" count to "standard" count and finds the corresponding cement content from the previously established calibration curves.

The use of the above described count-ratio method with calibration standards, such as the cylinder 38, minimizes the effects of temperature on the probe and analyzer and thus reduces the possible error. The use of a polymer-impregnated concrete standard, with its inherent low permeability, results in maintenance of a constant standard composition in a variety of operational environments.

When compared to the prior art the present invention has numerous advantages. First, since the probe of the present invention contains a single radioactive source and detector, the present invention is significantly easier to construct and operate and is more accurate and reliable than previously existing instruments. The incorporation of the spacer 28 minimizes the density dependence of the gauge and improves the accuracy of the present invention when compared to the prior art. Also, the use of a polymer-impregnated standard to compensate for error-producing variations in gauge electronics offers a simple and reliable way to provide temperature compensation and also compensation for the aging of components.

While a preferred embodiment has been shown and described, various modifications and substitutions may be made thereto without departing from the spirit and scope of the invention. Accordingly, it is to be understood that the present invention has been described by way of illustration and not limitation.

What is claimed is:
1. A non-destructive method of determining the quantity of a constituent of a pourable mixture comprising the steps of:
    placing over a tubular spacer a standard comprised of a solid material having an aperture therein and having a constant radiation absorption characteristic in a sample container;
    inserting a probe having a radiation source and a detector for backscattered radiation into the standard and measuring the radiation returned from the standard;
    removing the standard from the sample container;
    pouring the mixture to be tested into the container;
    inserting the probe into the mixture and taking a plurality of measurements of backscattered radiation at different vertical levels of the mixture;
    computing the average of the measurements taken with the test mixture in the container;
    calculating the ratio of the average count measured with the test mixture to the count measured with the standard; and
    determining the mixture content of the constituent of interest by comparing the calculated ratio to pre-established curves.

2. The method of claim 1 wherein the step of inserting the mixture into the sample container includes:
    working the mixture manually to promote consistent density within the sample container.

3. A gauge for determining the content of a particular constituent of a mixture comprising:
    a sample holder adapted to receive a mixture to be analyzed;
    a movable probe, said probe containing a source of radiation and detector means responsive to radiation backscattered from a target mixture;
    spacer means, said spacer means having an aperture for receiving said probe and being comprised of a material which is substantially transparent to radiation emitted by said source;
    means for supporting said probe and spacer means within said sample holder; and
    means connected to said detector means and responsive to the detection of backscattered radiation for providing an indication of the amount of the constituent of interest in the mixture.

4. The apparatus of claim 3 wherein said spacer means comprises:
    a Plexiglas cylinder.

5. The apparatus of claim 3 further comprising:
    a rigid calibration standard, said standard being adapted to be removably positioned in said sample holder about said spacer means.

* * * * *